United States Patent [19]

Weaver et al.

[11] Patent Number: 5,391,852
[45] Date of Patent: Feb. 21, 1995

[54] MONITOR FOR DETERMINING THE FLOW OF SHIELDING GAS

[75] Inventors: Charles D. Weaver; Lawrence B. Howell, both of Davenport, Iowa

[73] Assignee: Deere & Company, Moline, Ill.

[21] Appl. No.: 188,289

[22] Filed: Jan. 27, 1994

Related U.S. Application Data

[62] Division of Ser. No. 799,498, Nov. 27, 1991, Pat. No. 5,329,092.

[51] Int. Cl.⁶ .................................................. B23K 9/16
[52] U.S. Cl. ........................................ 219/74; 219/136
[58] Field of Search ................. 219/74, 136, 137.42; 228/219; 15/93 R

[56] References Cited

U.S. PATENT DOCUMENTS

| | | | |
|---|---|---|---|
| 2,630,513 | 3/1953 | Redmond | 219/136 |
| 3,433,925 | 3/1969 | Benfield | 219/137.42 |
| 4,249,062 | 2/1981 | Hozumi et al. | |
| 4,583,257 | 4/1986 | Bridges et al. | 15/93 R |
| 4,935,598 | 6/1990 | Ward | |
| 4,967,370 | 10/1990 | Stern et al. | |
| 5,013,887 | 5/1991 | Gold | |

OTHER PUBLICATIONS

"Robot Repeatability Test Equipment from John Deere", Deere Tech Services, John Deere Road, Moline, Illinois 61265, form E-3592-87-4.

"Industrial Robot Testing Concepts and Method, A Technical Overview", by Michael Wodzinski, Manager of Robot Testing, Selspot Systems, Ltd., Troy, Michigan, received 24 Mar. 1987.

Primary Examiner—Clifford C. Shaw

[57] ABSTRACT

Devices for monitoring, calibrating and maintaining a manufacturing robot. The first device comprises a reference pin mounted to a first member and a reference aperture located on a second adjacent member wherein the reference pin is inserted into the reference aperture when the two members are at their zero reference location. A second device checks tip alignment by periodically passing the welding tip of a welding torch through a V-shaped notch in a gauging block. The gauging block is electrically conductive and if the tip contacts the sidewalls of the V-shaped notch an electrical circuit is completed signalling the robot controller of tip misalignment. A third device comprises a shielding gas monitor having a closed tube to which the welding torch is applied for expelling shielding gas into the tube. The tube is in fluid communication with a flow gauge that measures gas flow and signals the controller if gas flow is insufficient.

3 Claims, 2 Drawing Sheets

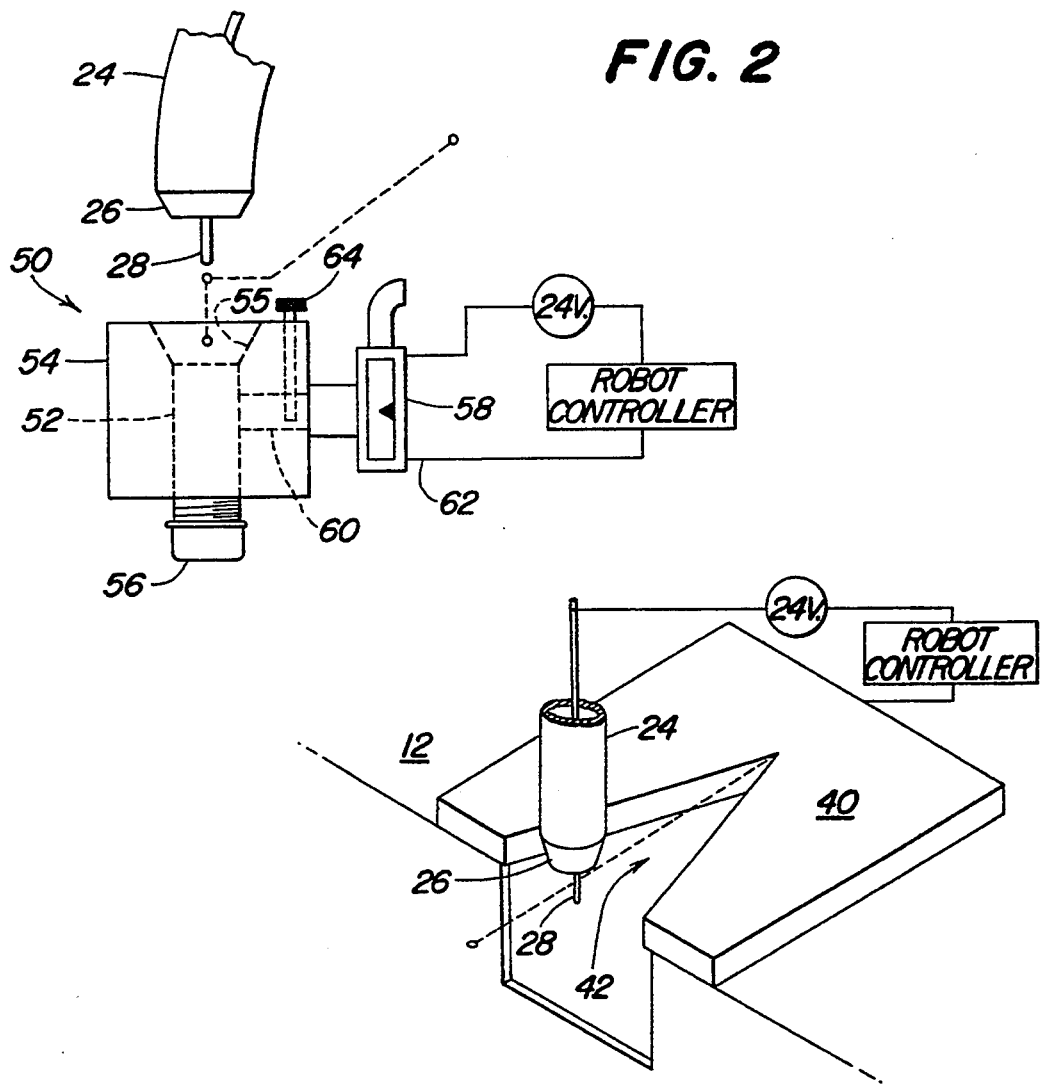
FIG. 2
FIG. 3
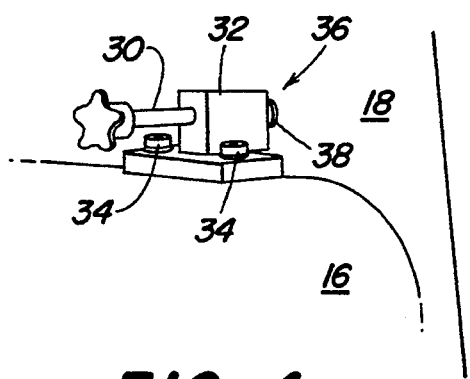
FIG. 4

MONITOR FOR DETERMINING THE FLOW OF SHIELDING GAS

This application is a division of application Ser. No. 07/799,498, filed Nov. 27, 1991 now U.S. Pat. No. 5,329,092.

BACKGROUND OF THE INVENTION

1. Filed of the Invention

The invention is directed to devices for calibrating, monitoring and maintaining manufacturing robots, especially welding robots.

2. Description of the Prior Art

Increasingly manufacturing robots, such as welding robots, are being used in industry for repetitive tasks. These robots are programmed to perform a specified manufacturing process. How these robots are integrated into the manufacturing process is crucial in taking full advantage of their unique advantages.

Manufacturing robots are provided with various pivoting joints, so that they can be manipulated into various configurations. For example, a second member maybe pivotally coupled to a first member. An encoder calculates the rotational position of the second member relative to the first member and provides a position signal to the robot controller. The encoder is provided with an absolute zero reference point from which the relative movements of the members can be calculated. Sometimes the encoders become broken or inaccurate. In removing an encoder from a robot, the first and second members are moved into a position where the encoder is at its absolute zero reference point and the encoder is removed. During this removal operation, the angular position of the first and second members maybe accidentally changed requiring the robot to be reprogrammed once the new encoder is installed. Such an occurrence results in additional downtime.

Welding robots are provided with welding torches having a series of shielding gas nozzles. Sufficient flow of the shielding gas during the welding process is essential for quality welds. If shielding gas flow is blocked or insufficient, defective welds are produced. Robotic welding systems typically monitor gas flow upstream from the nozzles and are incapable of detecting diversion of gas from the torch. Therefore the operator must be constantly alert for this problem.

In a welding robot, a welding wire is fed through a welding tube and projects past the shielding gas nozzles. If the wire tip is offset more than a small fraction of an inch from its desired location, the resulting weld will be uneven and weak since weld leg length and/or penetration are adversely affected by the offset. There are numerous sources of torch and wire tip misalignment. As such it is important that the alignment of the torch tip be checked periodically.

SUMMARY

It is an object of the present invention to provide a locating pin for locking the pivoting members of the robot at the zero reference point when replacing or repairing an encoder.

It is a feature of the present invention that one of the members is provided with a sliding reference pin and the other member is provided with a reference aperture into which the pin is inserted when the members are at the zero reference point.

It is another object of the present invention of providing a simple and reliable monitor for periodically checking shielding gas flow from the welding torch at the shielding gas nozzles during a work routine.

It is a feature of the present invention that the monitor comprises a tube into which the welding torch is periodically inserted and which is in fluid communication with a gas flow monitor for checking the shielding gas flow from the torch. The gas flow monitor can then signal the robot controller if there is sufficient gas flow.

It is another object of the present invention to provide an alignment gauging block for periodically checking welding tip alignment during a work routine.

It is a feature of this invention that the gauging block is made of an electrically conductive material and is provided with a V-shape notch into which the welding wire is periodically inserted.

BRIEF DESCRIPTION OF THE DRAWINGS

FIG. 2 is a side view and simplified electrical schematic of a shielding gas flow monitor.

FIG. 3 is a perspective view and simplified electrical schematic of the welding tip alignment tool.

FIG. 4 is a perspective view of the zero point alignment tool.

DETAILED DESCRIPTION

Figure 1:
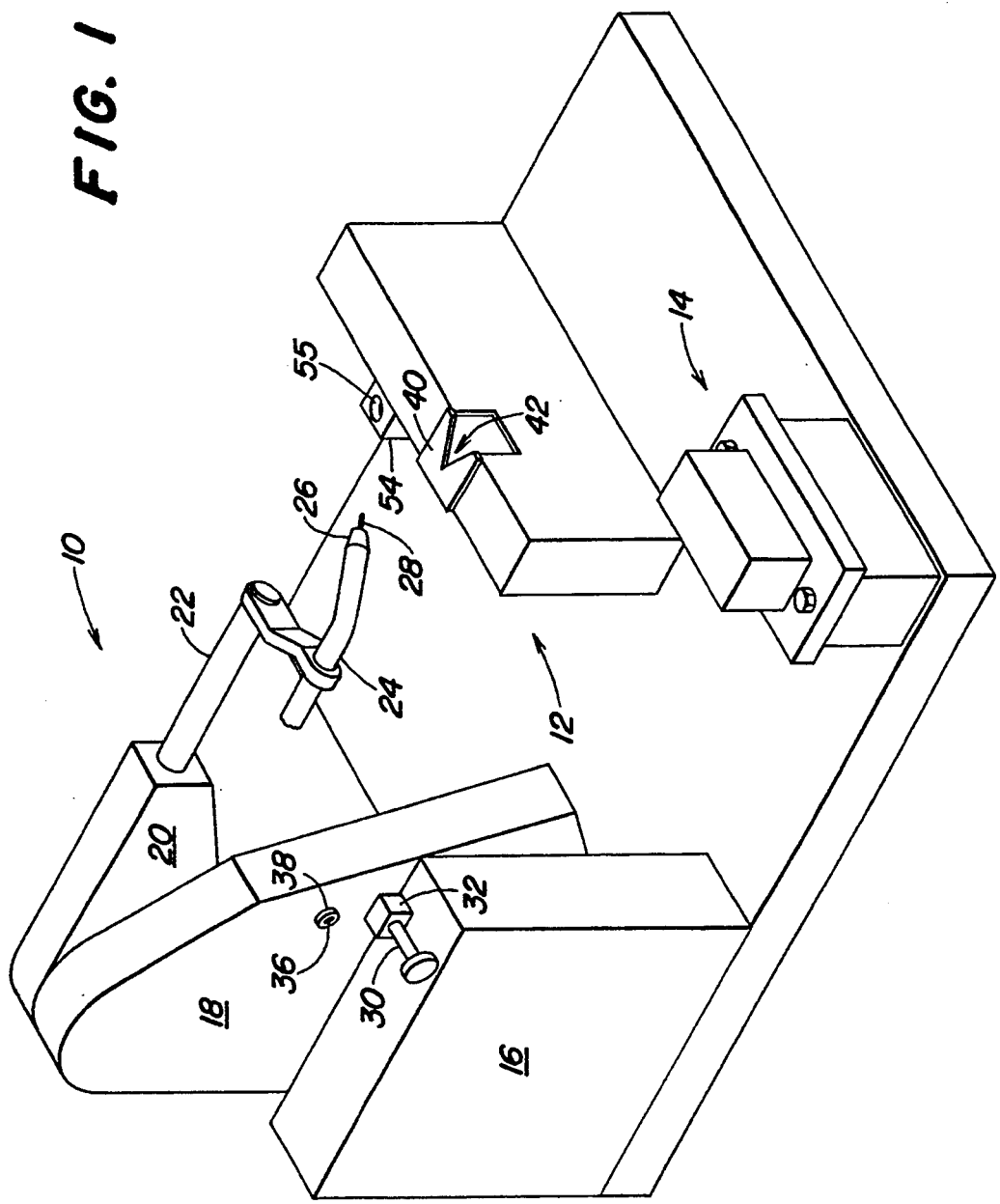
FIG. 1 is a perspective view of a welding robot.

FIG. 1 shows a robotic welding system comprises a welding robot 10, a gauging station 12 and a work station 14. The robot is any conventional welding robot such as a Cloos MIG welding robot. The robot 10 is provided with a first member 16 that is pivotally coupled to a second member 18. Second member 18 is pivotally coupled to third member 20. A fourth member 22 is axially pivotable in third member 20. In addition, the base of the robot maybe rotated about a vertical axis.

The end of fourth member 22 is provided with a welding tube 24 having a welding torch 26. The welding tube has conduits for directing shielding gas and welding wire to the welding torch. The welding torch is provided with shielding gas nozzles (not shown) and welding wire tip 28. The shielding gas and wire are expelled from the welding torch 26. Only a portion of the welding tube is illustrated.

The various pivot joints of the robot permit the robot to place the welding torch into different welding configurations. Each of the pivot joints is provided with an encoder for informing the robot controller of the position of the member relative to the adjacent member.

If an encoder becomes broken it must be replaced for the robot to operate correctly. To replace the encoder the two adjacent pivoting members are placed in the zero reference point location of the encoder and the pivot members are mechanically locked in place by reference pin 30. The reference pin is slidably received in holder 32 which is mounted to the first member by bolts 34. The reference pin engages a reference aperture 36 located on the second member at the zero reference point position. The aperture 36 is provided with a bushing 38 for receiving the reference pin. Although only one reference pin and cooperating aperture is shown between the first and second member, such reference pins and apertures would be located at all the pivot joints.

The gauging station 12 is provided with a welding tip alignment gauging block 40 having a V-shaped notch 42. Periodically during a welding operation the robot is programmed to check the alignment of the welding tip by moving it through the gauging notch as illustrated by the dashed line in FIG. 3. More specifically the welding tip is moved from the open end of the V-shaped notch to the apex of the notch.

As illustrated in FIG. 3, a 24-volt low amperage current is applied to the welding wire as it is moved through the notch. The gauge block is made of electrically conductive material and is electrically connected to the robot controller. If the welding tip contacts the sidewall of the notch an electric circuit is completed. The completion of this circuit signals the controller that the welding tip is misaligned. If a misalignment condition is detected the robot controller repositions the robot into a maintenance position and alerts the operator of the misalignment. After the operator correctly aligns the welding tip, the robot controller retests the welding tip in the V-shaped notch and returns to the programmed work routine.

The shielding gas monitor 50 works in much the same way as the alignment gauging block. The shielding gas monitor comprises a cylindrical tube 52 formed in block 54. The tube has a funnel shaped opening 55 at the top. The tube is closed at the bottom by cap 56. Cap 56 is removable so that debris can be removed that collects at the bottom of the tube. A gas flow gauge 58 is in fluid communication with tube 52 by communication line 60.

Periodically during a work operation the robot controller is programmed to check shielding gas flow. To test shielding gas flow the robot controller moves the welding torch so that it engages the funnel shaped opening of the tube as illustrated by the dashed line in FIG. 4. The shielding gas is then expelled from the shielding gas nozzles into tube 52. The fluid pressure is transferred through communication line 60 to the fluid pressure gauge 58. As illustrated in FIG. 4, the fluid pressure gauge is in electrical communication with the robot controller and signals the robot controller through electrical line 62 if there is insufficient pressure generated by the shielding gas. If there is insufficient pressure generated by the shielding gas, the robot controller places the robot into a maintenance position and signals the operator. The operator then manually cleans the nozzles and returns the robot to its work operation. The robot controller retests the shielding gas flow through the welding torch and then returns to the programmed work routine.

The shielding gas monitor is set by having the operator inspect the nozzles to check if they are operating correctly and then applying the welding torch to the monitor. Shielding gas is expelled from the torch into the monitor. A screw 64, that acts as a throttle to the shielding gas flow through the communication line 60, is inserted into the line until the fluid pressure gauge gives a no flow signal. The throttle screw is then backed off slightly until the gauge gives a sufficient flow signal.

The above described inventions facilitate the operation of robots in a manufacturing line allowing monitoring operations to be incorporated into the robot manufacturing routine and also minimizing maintenance downtime when installing and repairing an encoder. As such, the inventions should not be limited to the above-described embodiments, but should be limited solely to the claims that follow.

We claim:

1. A monitor for determining the flow of shielding gas from a welding robot, the welding robot is provided with a welding torch having shielding gas nozzles mounted thereon, the monitor comprising:
    a closed tube into which the shielding gas nozzles can be inserted;
    a gas flow gauge in fluid communication with the closed tube for measuring the flow of gas from the shielding gas nozzles; and
    means for signalling the robot when the gas flow as measured by the gas flow gauge is insufficient.

2. A monitor as defined by claim 1 wherein a calibrating throttle is positioned between the gas flow gauge and the tube for calibrating the gas flow gauge.

3. A monitor as defined by claim 2 wherein tube is provided with a removable debris trap.

* * * * *